（12）United States Patent
Okamura

(10) Patent No.: US 8,810,814 B2
(45) Date of Patent: Aug. 19, 2014

(54) IMAGE PROCESSOR AND IMAGE PROCESSING SYSTEM

(75) Inventor: Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 449 days.

(21) Appl. No.: 13/137,523

(22) Filed: Aug. 24, 2011

(65) Prior Publication Data

US 2012/0062920 A1   Mar. 15, 2012

(30) Foreign Application Priority Data

Sep. 9, 2010 (JP) .................................. 2010-202292
Jul. 8, 2011 (JP) .................................. 2011-151944

(51) Int. Cl.
*G06K 15/02* (2006.01)

(52) U.S. Cl.
USPC ........................................ 358/1.13; 358/1.15

(58) Field of Classification Search
CPC   G06K 15/1859; H04N 1/3875; H04N 1/3935
USPC ................................................. 358/1.1, 1.13
See application file for complete search history.

(56) References Cited

U.S. PATENT DOCUMENTS 6,003,069 A * 12/1999 Cavill ........................... 709/205
2010/0034551 A1   2/2010 Okamura
2012/0300244 A1 * 11/2012 Kim et al. ...................... 358/1.13

FOREIGN PATENT DOCUMENTS

JP   2007-336014 A   12/2007
JP   2010-041415 A   2/2010

* cited by examiner

*Primary Examiner* — King Poon
*Assistant Examiner* — Iriana Cruz
(74) *Attorney, Agent, or Firm* — Harness, Dickey & Pierce, P.L.C.

(57) ABSTRACT

An image processor including a memory to store information on the file format and the maximum file size of image data processable by the image processor and image data processable of one or more external devices; a judging device to judge whether image data input to the image processor can be processed by the image processor or one of the external devices in terms of the file format and file size; an image converter; a transfer controller to transfer the input image data to the external device when the input image data cannot be processed by the image processor but can be processed by the external device while transferring the image data to the image converter when the image data can be processed by the image processor; and an output device to output an image based on the image data processed by the external device or the image converter.

5 Claims, 16 Drawing Sheets

| FILE FORMAT | none | | |
|---|---|---|---|
| *.jpg | | | |
| *.tif | | | |
| *.pdf | | | |
| | | | |
| | | | |
| | | | |
| | | | |
| | | | |

| CAPACITY | | | |
|---|---|---|---|
| | | | |

[ INITIAL DATA OF EXTERNAL DEVICE ]

FIG. 8

| FILE FORMAT | EXTERNAL DEVICE A | EXTERNAL DEVICE B | |
|---|---|---|---|
| *.jpg | | | |
| *.tif | | | |
| *.pdf | | | |
| *.doc | O | | |
| *.txt | O | | |
| *.csv | | O | |
| | | | |
| | | | |

| | EXTERNAL DEVICE A | EXTERNAL DEVICE B | |
|---|---|---|---|
| CAPACITY | 1G | 4G | |

[ DATA OF EXTERNAL DEVICE AFTER COMMUNICATION ]

FIG. 9

| FILE FORMAT | EXTERNAL DEVICE A | EXTERNAL DEVICE B | EXTERNAL DEVICE C |
|---|---|---|---|
| *.jpg | | | O |
| *.tif | | | O |
| *.pdf | | | O |
| *.doc | O | | |
| *.txt | O | | O |
| *.csv | | O | |
| *.abc | | | O |
| | | | |

| | EXTERNAL DEVICE A | EXTERNAL DEVICE B | EXTERNAL DEVICE C |
|---|---|---|---|
| CAPACITY | 1G | 4G | 16G |

[ DATA OF EXTERNAL DEVICE AFTER EXTERNAL DEVICE C IS CONNECTED ]

FIG. 10

CONVERTIBILITY

| FILE FORMAT | AVAILABILITY |
|---|---|
| *.jpg | O |
| *.tif | O |
| *.pdf | O |
|  |  |
|  |  |
|  |  |
|  |  |

| AVAILABLE CAPACITY | 512M |
|---|---|

[ DEFAULT CONVERTIBLE DATA ]

FIG. 11

CONVERTIBILITY

| FILE FORMAT | AVAILABILITY |
|---|---|
| *.jpg | O |
| *.tif | O |
| *.pdf | O |
| *.doc | O |
| *.txt | O |
| *.csv | O |
| *.abc | O |

| CAPACITY | 16G |
|---|---|

[ CONVERTIBLE DATA AFTER RECEIVING AVAILABLE/
UNAVAILABLE FILE FORMAT AND CAPACITY DATA
FROM EXTERNAL DEVICE ]

DATA A FOR INITIALIZATION
(SENT FROM MAIN BODY OF
MFP TO EXTERNAL DEVICE)

DATA B FOR INITIALIZATION
(SENT FROM EXTERNAL DEVICE
TO MAIN BODY OF MFP)

DATA A FOR INITIALIZATION
(SENT FROM MAIN BODY OF
MFP TO EXTERNAL DEVICE)

DATA B FOR INITIALIZATION
(SENT FROM EXTERNAL DEVICE
TO MAIN BODY OF MFP)

IMAGE PROCESSOR AND IMAGE PROCESSING SYSTEM

CROSS-REFERENCE TO RELATED APPLICATIONS

This patent application is based on and claims priority pursuant to 35 U.S.C. §119 to Japanese Patent Applications Nos. 2010-202292 and 2011-151944, filed on Sep. 9, 2010 and Jul. 8, 2011, respectively, in the Japan Patent Office, the entire disclosure of which is hereby incorporated herein by reference.

FIELD OF THE INVENTION

The present invention relates to an image processor. Particularly, the present invention relates to an image processor to make it possible to convert data, which cannot be processed by the image processor in terms of file format or data size, to such data as to be able to be processed by the image processor. In addition, the present invention also relates to an image processing system using the image processor.

BACKGROUND OF THE INVENTION

In a field of multifunction peripheral (MFP) having multiple functions such as copier, facsimile, printer and scanner functions, it is known that a MFP accesses a removable medium or a file on a network to print image data stored therein.

However, even when a MFP can access a file, there is a case where the file format of the file is not available to the MFP, or the file has too large a file size to be processed by the MFP, thereby causing a problem in that the MFP cannot perform the desired processing.

A case where the file format is not available to a MFP will be described by reference to FIG. 29.

Referring to FIG. 29, the file format of a file stored in a removable medium is not available to a MFP, i.e., the file format is a non-MFP-compliant file format. Therefore, the MFP cannot print out the file. In this regard, the removable medium may store files having a file format available to the MFP. When a user tries to print out a file without considering whether or not the file format of the file is available to the MFP, a problem in that the MFP cannot convert the file to print data, and thereby the file cannot be printed out may be caused.

A case where the file has too large a file size to be processed by a MFP will be described by reference to FIGS. 27 and 28.

FIG. 27 illustrates a case where a MFP having a memory with a capacity of 512 Mbyte prints out a JPEG image, which has a file size of 50 Mbyte when being decompressed. A conventional MFP expands an image data stored in a removable medium such as a SD memory card (herein after referred to as a SD card) in a memory installed in the MFP, and converts the image data to print data to print out the image data.

FIG. 28 illustrates a case where a MFP having a memory with a capacity of 512 Mbyte tries to print out a JPEG image, which has a file size of 900 Mbyte when being decompressed, but the MFP cannot print out the JPEG image. When a MFP tries to print out an image data with a file size greater than the capacity of the memory installed in the MFP, a problem in that the image data cannot be printed out because storage cannot be reserved in the MFP may be caused.

In this regard, a technique is proposed in which a MFP functions as a remote file server, and remotely accesses data stored in a removable medium connected with an external information processor on a network.

However, even when a MFP can remotely access data stored in a removable medium of an external device, the problem such that the MFP cannot print out the data because the file format of the data is not available to the MFP, or the data have too large a size to be processed by the MFP cannot be avoided.

For these reasons, the present inventor recognized that there is a need for an image processor which can process data using an external device on a network even when the file format of the data is not available to the MFP or the data have too large a size to be processed by the MFP.

BRIEF SUMMARY OF THE INVENTION

This patent specification describes a novel image processor, one embodiment of which includes a memory to store information on a file format and a maximum file size of image data which can be processed by the image processor and information on a file format and a maximum file size of image data which can be processed by each of one or more external devices; a judging device to judge whether image data input to the image processor can be processed by the image processor or the one or more external devices in terms of the file format and the file size by reference to the information stored in the memory; an image converter to convert the input image data so as to be output by the image processor; a transfer controller to transfer the input image data to one of the one or more external devices when the judging device determines that the input image data cannot be processed by the image processor but can be processed by the one of the one or more external devices while transferring the input image data to the image converter when the judging device determines that the input image data can be processed by the image processor; and an output device to output an image based on the image data processed by the one of the one or more external devices or the image converter.

This patent specification further describes a novel image processing system, one embodiment of which includes the image processor mentioned above; one or more external devices; and a network through which the image processor is communicably connected with the one or more external devices.

BRIEF DESCRIPTION OF THE SEVERAL VIEWS OF THE DRAWINGS

A more complete appreciation of aspects of the invention and many of the attendant advantage thereof will be readily obtained as the same become better understood by reference to the following detailed description when considered in connection with the accompanying drawings, wherein:

FIG. 6 is a block diagram illustrating a part of the controller illustrated in FIG. 3 performing controlling concerning input/output of information to or from an external device;

FIGS. 7-9 are schematic views illustrating structures of external device data illustrated in FIG. 3;

FIGS. 10-11 are schematic views illustrating structures of convertible data illustrated in FIG. 3;

DETAILED DESCRIPTION OF THE INVENTION

Figure 1:
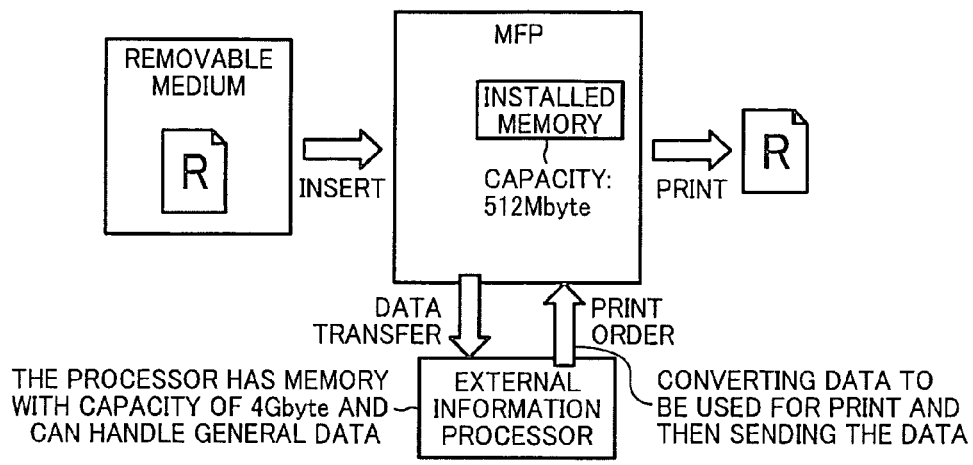
FIG. 1 is a conceptual diagram illustrating an example of an image processing system including an image processor of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, example embodiments of the present patent application are described.

FIG. 1 is a conceptual diagram illustrating an example of an image processing system including an image processor of the present invention.

Figure 27:
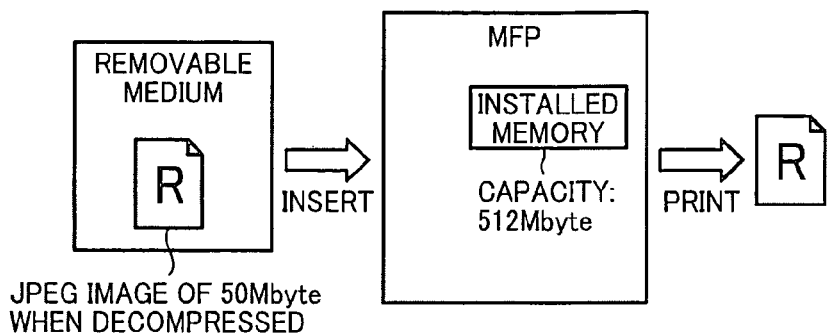
FIGS. 27-29 are schematic views for explaining problems in conventional image processing systems.
Figure 28:
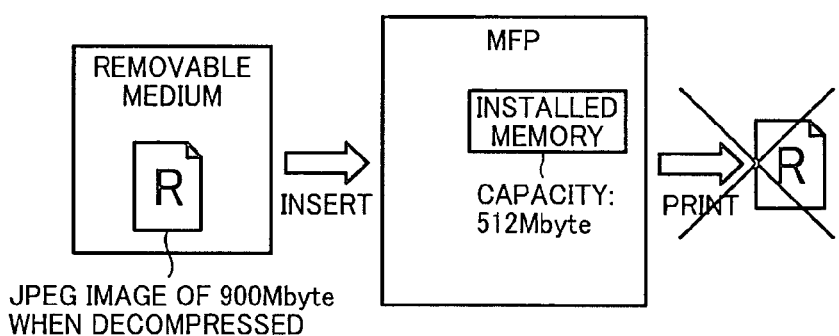
Figure 29:
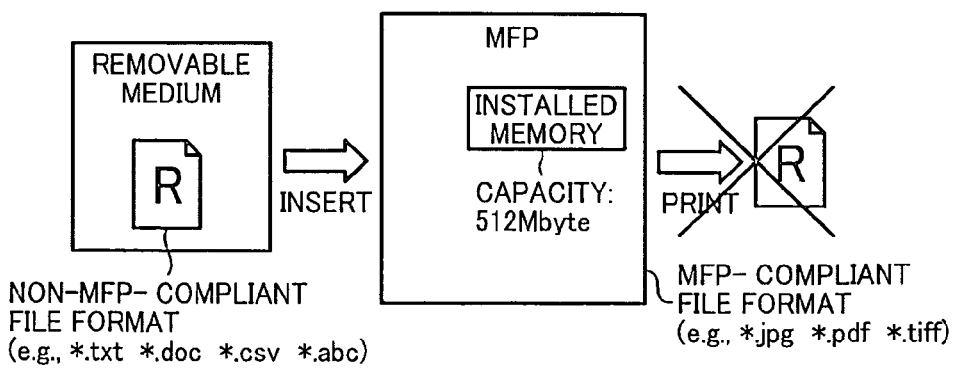

In order to solve the problems described above by reference to FIGS. 27-29, as illustrated in FIG. 1, the image processing system has configuration such that a MFP including an image processor is connected with an external information processor having a memory with a large capacity (e.g., 4 Gbyte). When image data stored in a removable medium inserted into the MFP cannot be printed out by the MFP, the image data are decompressed in the external information processor. The decompressed image data are converted to print data by the external information processor while being sent to the MFP. In this regard, the process of sending the print data to the MFP may be performed after completing the process of converting the image data to print data. In this application, the file size of image data is sometimes referred to as capacity.

In addition, when image data stored in a removable medium inserted into the MFP have a non-MFP-compliant file format, the image data are also decompressed in an external information processor. The decompressed image data are converted to print data by the external information processor while being sent to the MFP. In this case, the MFP issues an instruction command to the external information processor.

The hardware configuration of the image processor of the present invention will be described by reference to FIG. 2.

Figure 2:
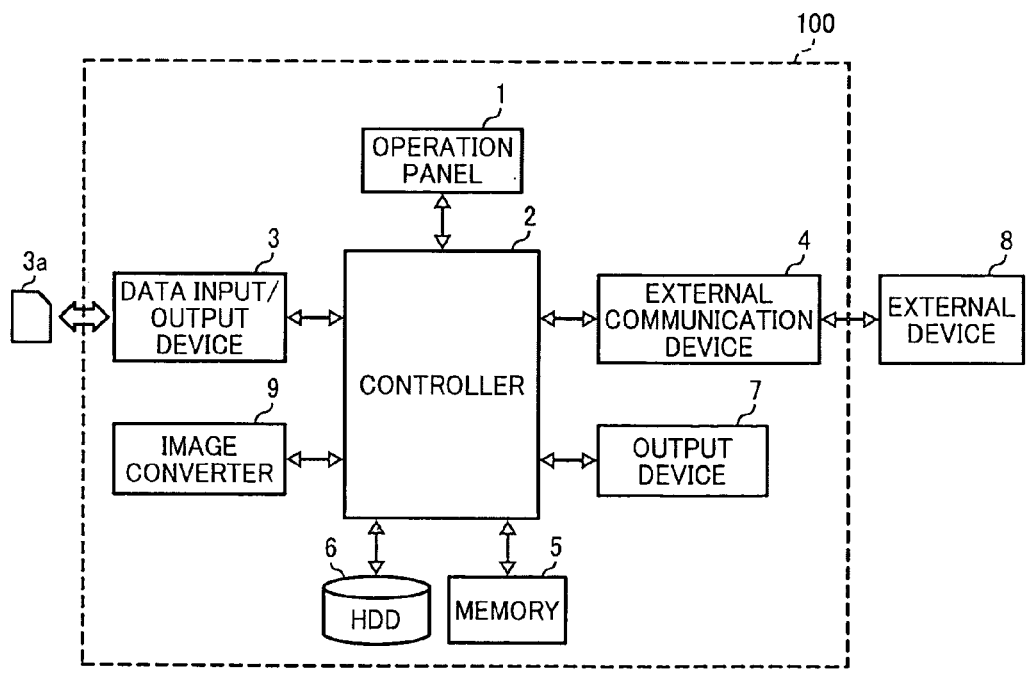
FIG. 2 is a block diagram illustrating hardware of the image processing system illustrated in FIG. 1.

Referring to FIG. 2, an image processor 100 (hereinafter sometimes referred to as a main body of a MFP) includes an operation panel 1, a controller 2, a data input/output device 3, an external communication device 4, a memory 5, a hard disc drive (HDD) 6, an output device 7, and an image converter 9. As illustrated in FIG. 2, an external device 8 is connected with the main body 100 of the MFP via the external communication device 4 so that the external device 8 and the main body 100 of the MFP communicate with each other.

The external device 8 communicating with the main body 100 of the MFP via the external communication device 4 serves an external device. Specific examples of the external device include information processors such as personal computers and work stations, image forming apparatuses such as MFPs other than the MFP 100, etc. If the main body 100 of the MFP is considered to be a main machine, the external device 8 is considered to be a sub machine. The external device 8 uses image processing methods and image data expanding methods different from those of the main body 100 of the MFP. In addition, the external device 8 can be operated by a request from the controller 2. Further, the external device 8 has a device to send the data produced thereby upon request from the controller 2 to the main body 100 of the MFP. Although FIG. 2 illustrates only one external device, the main body 100 of the MFP may communicate with multiple external devices. Hereinafter, description will be made while assuming that the main body 100 of the MFP communicates with multiple external devices.

The communication between the external communication device 4 and the external device 8 is typically performed using a local area network (LAN), but is not limited thereto. For example, networks using an IEEE1394 or USB interface can also be used.

The external communication device 4 is an interface to connect the controller 2 with the external device 8 using a communication network so that the controller can communicate with the external device.

The memory 5 is a storage area functioning as a primary storage device. The controller 2 expands image data in the memory to perform various processings thereon.

The HDD 6 is a storage area functioning as a secondary storage device. The HDD 6 is a nonvolatile storage area, and continues to store image data therein. In addition, the HDD 6 stores information such as capacities of memories of multiple external devices 8 and names of file formats available to the multiple external devices.

The data input/output device 3 is an I/O interface for the removable medium 3a. Specific examples of the removable medium 3a include general-purpose media such as SD cards. The data input/output device 3 has a configuration such that the removable medium 3a can be detachably attachable thereto. When the removable medium 3a is inserted into the data input/output device 3, the data input/output device 3 reads out the data stored in a storage area of the medium or writes data therein. Therefore, the controller 2 can perform a data input/output operation on the removable medium 3a using the data input/output device 3. When the data input/output device 3 detects that a removable medium is inserted thereinto, the data input/output device 3 informs the controller 2 that a removable medium is inserted thereinto.

The operation panel 1 is a user interface using a touch panel or the like, and serves as a displaying device visibly displaying results of a control operation of the controller 2 for users while serving as an inputting device by which instructions of users can be input to the controller 2.

The image converter 9 has a function of processing input image data to produce different image data, and ASICs for use in image processing or the like can be used therefor. When the image converter 9 performs image processing, the image converter uses the memory 5 as a primary storage device.

The output device 7 is, for example, an electrophotographic image forming device, and forms a visible image on a recording material such as plain papers according to input print data.

When a file, which cannot be processed by the main body of the MFP, is input to the MFP to be processed, the controller 2 sends the file and an instruction command to the external device 8.

When inputting a file, a method in which a removable medium 3a storing a file is inserted into a removable storage 3 can also be used. In addition, the request for processing a file is assumed to be a request for printing the file.

Figure 3:
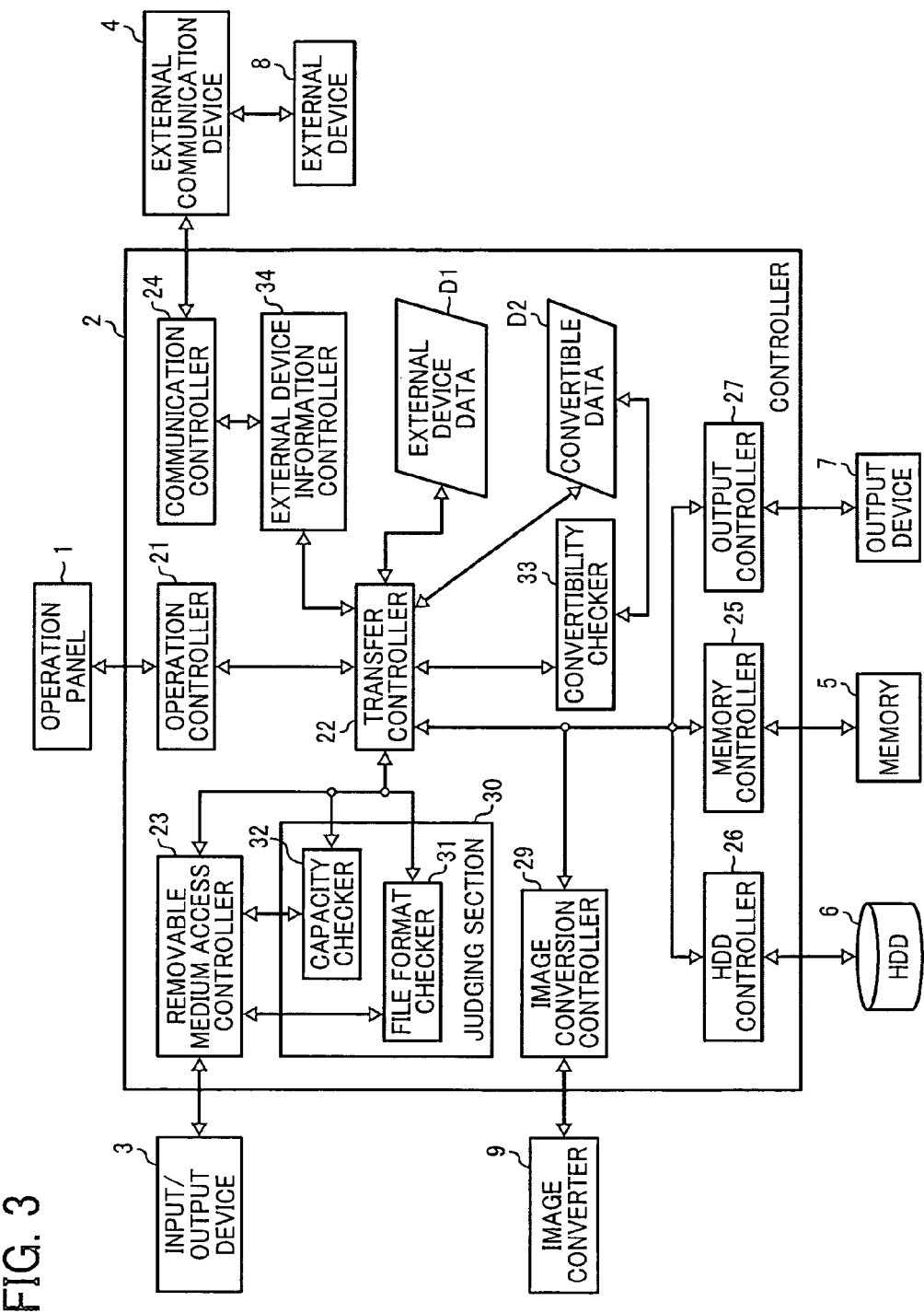
FIG. 3 is a block diagram illustrating a controller of the image processing system illustrated in FIG. 2.

FIG. 3 illustrates the functions of the controller 2.

A central processing unit (not shown) of the main body 100 of the MFP develops control software program, which is stored in the HDD 6, in the memory 5 to execute the program. As a result of cooperation of the software program with the hardware devices, each of the functional blocks of the controller 2 illustrated in FIG. 3 can be constructed.

As illustrated in FIG. 3, the controller 2 includes an operation controller 21, a transfer controller 22, a removable medium access controller 23, a communication controller 24, a memory controller 25, a HDD controller 26, an output controller 27, an image conversion controller 29, a judging section 30, a convertibility checker 33, and an external device information controller 34. The judging section 30 serves as a judging device and includes a file format checker 31 and a capacity checker 32.

The operation controller 21 has a function of controlling the operation panel 1. The operation controller 21 displays results of a control operation of the transfer controller 22 while transferring contents of an input from the operation panel 1 to the transfer controller 22.

Figure 4:
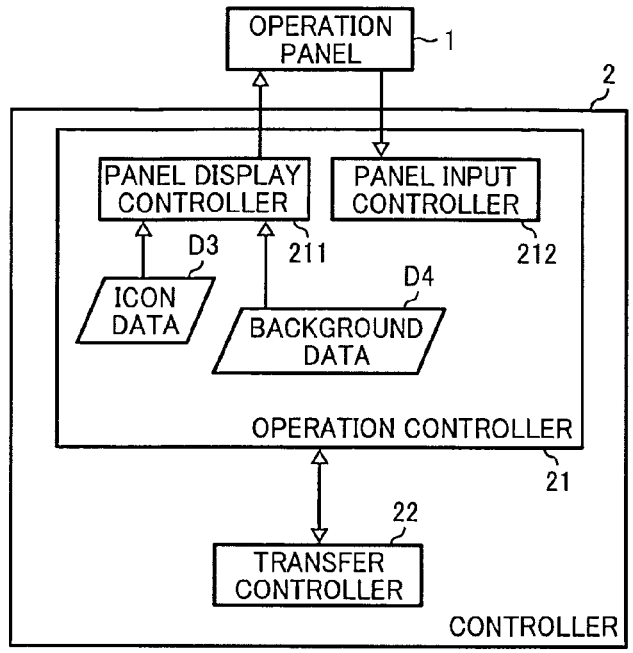
FIG. 4 is a block diagram illustrating an operation controller of the controller illustrated in FIG. 3.

FIG. 4 illustrates the detailed structure of the operation controller 21. As illustrated in FIG. 4, the operation controller 21 includes a panel display controller 211 and a panel input controller 212. When receiving a panel display control request from the transfer controller 22, the panel display controller 211 acquires necessary data from icon data D3 and background data D4, and displays an image in the operation panel 1 using the acquired data. When a button or an icon button in the operation panel 1 is pushed by a user, the panel input controller 212 notifies the transfer controller 22 that a button is pushed.

Referring back to FIG. 3, the transfer controller 22 summarizes all the inputs and outputs from other controllers, and issues orders thereto. The memory controller 25 controls data reading from the memory 5 and data writing therein. The HDD controller 26 controls data reading from the HDD 6 and data writing therein. The output controller 27 determines the addressee (output device 7), to which image data are to be sent, while setting the parameters (such as data size) for use in outputting the image data. The image conversion controller 29 informs the image converter 9 of the address of the image data input from the SD card in the memory and the address of the converted image data in the memory while setting the image conversion conditions under which the image converter 9 converts the format of the original image data.

Next, a portion of the controller 2 performing control operations concerning the data input/output device 3 will be described.

Figure 5:
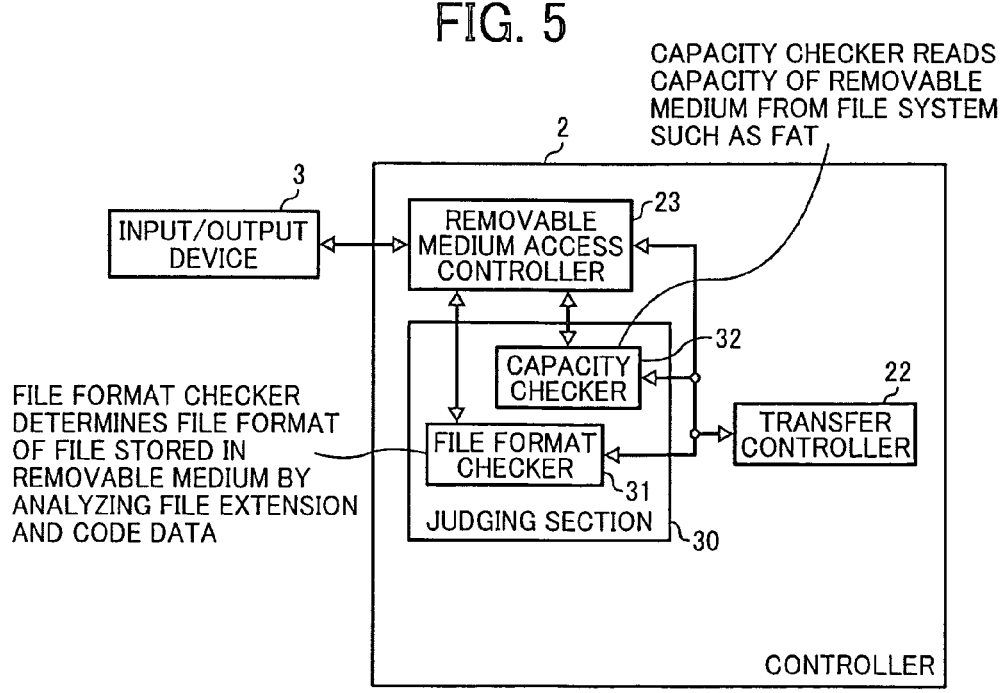
FIG. 5 is a block diagram illustrating a part of the controller illustrated in FIG. 3 performing controlling concerning a data input/output device to input and output data to or from a removable medium.

FIG. 5 is a block diagram illustrating only a portion of the controller illustrated in FIG. 3 performing control operations concerning the data input/output device 3 to input and output data to or from a removable medium. The removable medium access controller 23 controls data reading from the data input/output device 3 and data writing therein.

The capacity checker 32 confirms the capacity of the removable medium 3a inserted into the data input/output device 3. Since a file system such as FAT (File Allocation Table) is constructed in a storage area of the removable medium 3a, the capacity checker 23 confirms the capacity of the removable medium 3a stored in the storage area thereof.

The file format checker 31 checks the extension of the file stored in the file system or the inner structure of the file, to confirm the file format of the file.

Next, a portion of the controller 2 performing control operations concerning input/output of information to or from the external device 8 will be described.

Figures 6, 7:
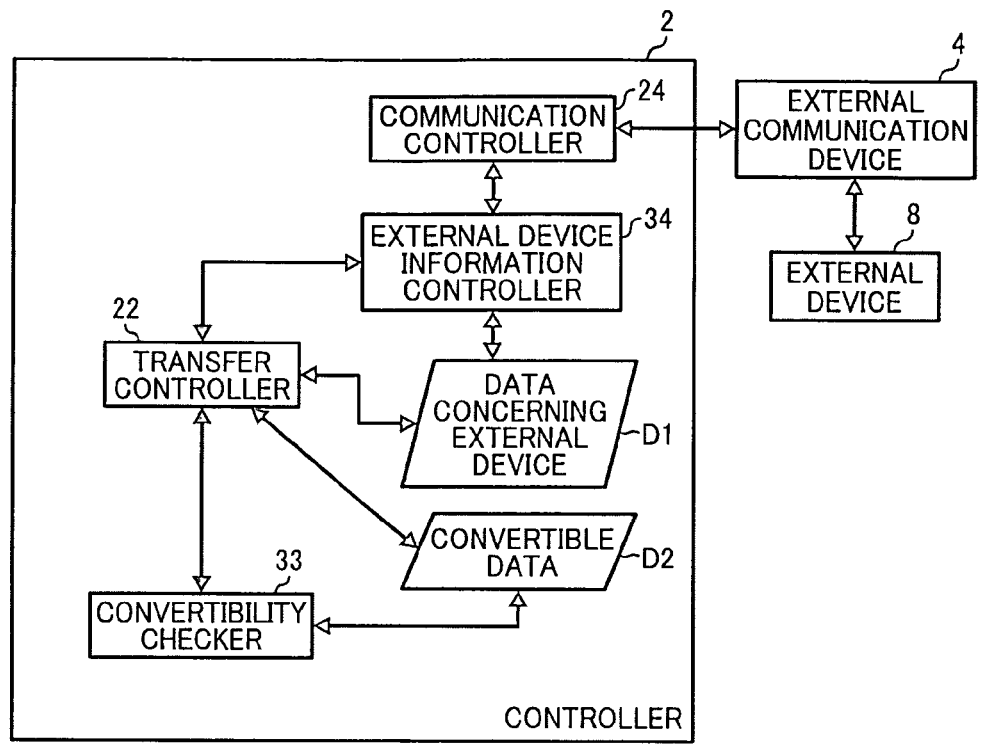

FIG. 6 is a block diagram illustrating only a portion of the controller 2 illustrated in FIG. 3 performing control operations concerning input/output of information to or from the external device 8. The communication controller 24 controls input/output of information to or from the external device 8 via the external communication device 4. Through the information input/output operations, the communication controller 24 obtains information on the available capacity of the external device 8 and the file format available thereto.

The external device information controller 34 reflects the information on the available capacity of the external device 8 and the file format available thereto to the external device data D1. The convertibility checker 33 determines based on the convertible data D2 whether or not the image conversion requested by the transfer converter 22 can be performed.

The external device data D1 and the convertible data D2 are stored in the HDD 6. When these data are needed for the control operations to be performed by the transfer converter 22, the external device information controller 34 or the convertibility checker 33, the data are read thereby to be referred to. In FIGS. 3 and 6, the transfer controller 22, the external device information controller 34 and the convertibility checker 33 are described in the vicinity of the external device 8 merely because of deeply relating to control of information exchange between the controllers 22, 34 and 33 and the external device 8.

Next, the data structure of the external device data D1 and the convertible data D2 will be described. In this regard, the term "data structure" means the logical structure of data which is represented as interrelation between elements of data.

The external device data D1 include information concerning the available capacity of an external device and file formats available to the external device, which is obtained after the main body of the MFP communicates with the external device. Before the main body of the MFP communicates with an external device, no data are stored in the external device data D1 as illustrated in FIG. 7. However, as illustrated in FIG. 7, data concerning the file formats (*.jpg, *.tif and *.pdf) available to the main body of the MFP are stored as file format in the external device data D1.

After the main body of the MFP communicates with external devices A and B, such data as illustrated in FIG. 8 are stored in the external device data D1. In addition, when the main body of the MFP communicates with an external device C capable of handling a file with a file format of *.abc, the data D1 are changed to the data as illustrated in FIG. 9.

The convertible data D2 include information concerning available capacity of the main body of the MFP, and file formats available to the main body, and information concerning available capacity of the external devices, and file formats available to the external devices, which is obtained from the external device data D1.

In this regard, the main body of the MFP obtains information concerning convertible file formats from the image converter 9 through the image conversion controller 29 while obtaining information concerning available capacity from the memory controller 25 to constitute the convertible data D2.

Before the main body of the MFP communicates with an external device, only the data of the main body are stored in the convertible data D2 as illustrated in FIG. 10. After the main body of the MFP communicates with an external device (serving as the external device 8), information concerning the available file formats and capacity of the external device is obtained and the data D2 are changed as illustrated in FIG. 11.

The convertibility checker 33 makes a judgment by referring to the convertible data D2 (illustrated in FIG. 11) storing information concerning the available file formats and capacity of the main body of the MFP and the external device 8, and the results of checking the file stored in the removable medium 3a performed by the file format checker 31 and the capacity checker 32.

Figure 12:
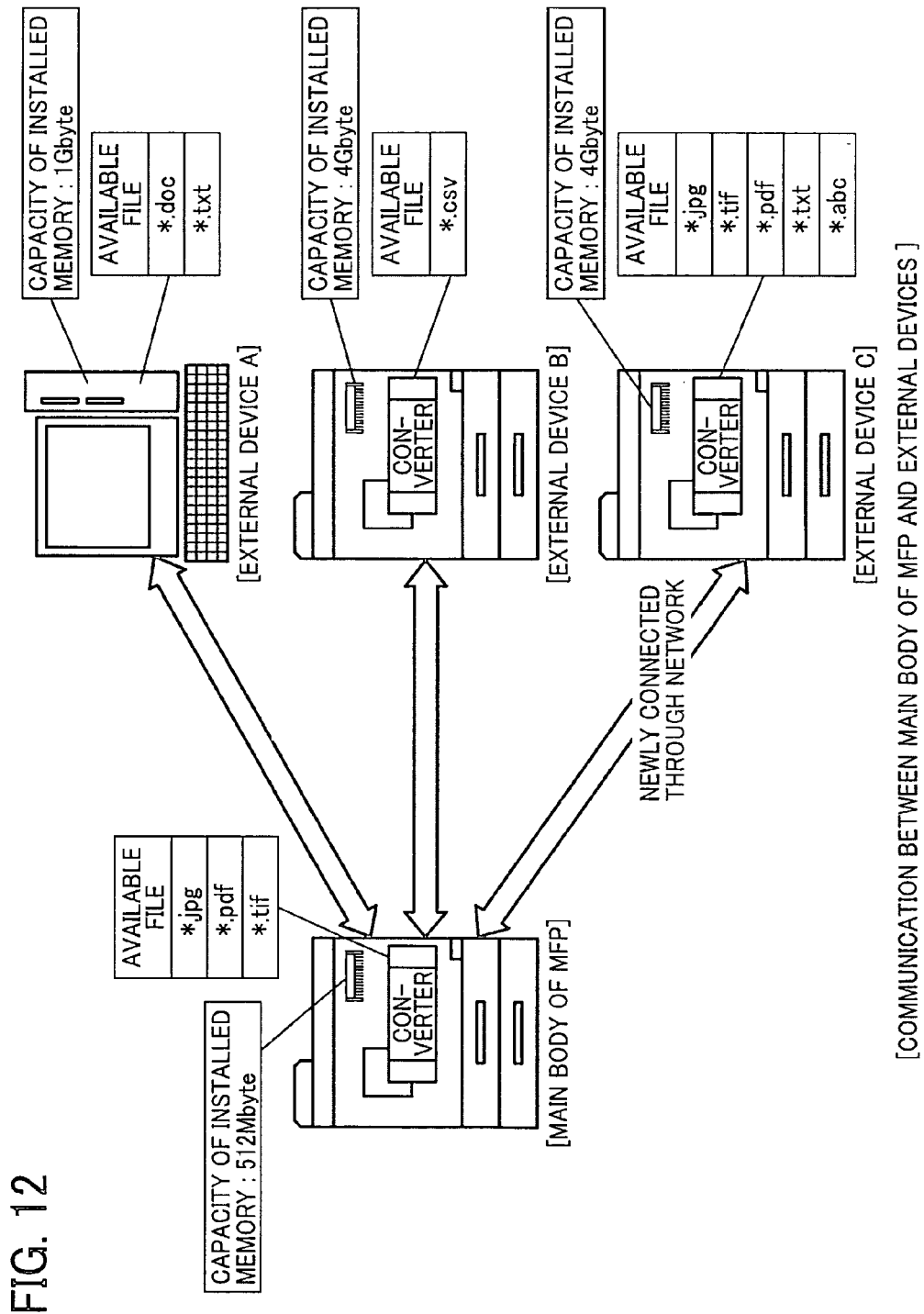
FIG. 12 is a schematic view illustrating interaction between a main body of a MFP and external devices.

FIG. 12 is a schematic view illustrating interaction concerning available file formats between the main body of MFP and the external devices 8. As illustrated in FIG. 12, two external devices A and B have been communicably connected with the main body of the MFP through a network, and an external device C is newly connected with the main body. In this case, by accessing the external device C while exchanging data, the main body of the MFP obtains information concerning the file formats available to the external device C.

When the external device C is thus connected with the main body of the MFP and the information thereon is obtained, the external device information controller 34 updates the external device data D1. As a result, the external device data D1 are changed from the data illustrated in FIG. 8 to the data illustrated in FIG. 9. In response to this change, the convertible data D2 are automatically updated, i.e., the data illustrated in FIG. 10 are automatically changed to the data illustrated in FIG. 11. This operation is illustrated in FIG. 12.

Hereinbefore, the operation of an example of the image processor of the present invention has been described by reference to the functional structures illustrated in FIGS. 6-12. Hereinafter, the operation of the example of the image processor of the present invention to be performed using the functional structures will be described. In the following description of the operation, initially a description is made while focusing changes of the display of the operation panel 1, and then a description using flowcharts is made.

FIGS. 13-18 illustrate the operation panel 1, which displays different images.

Figure 13:
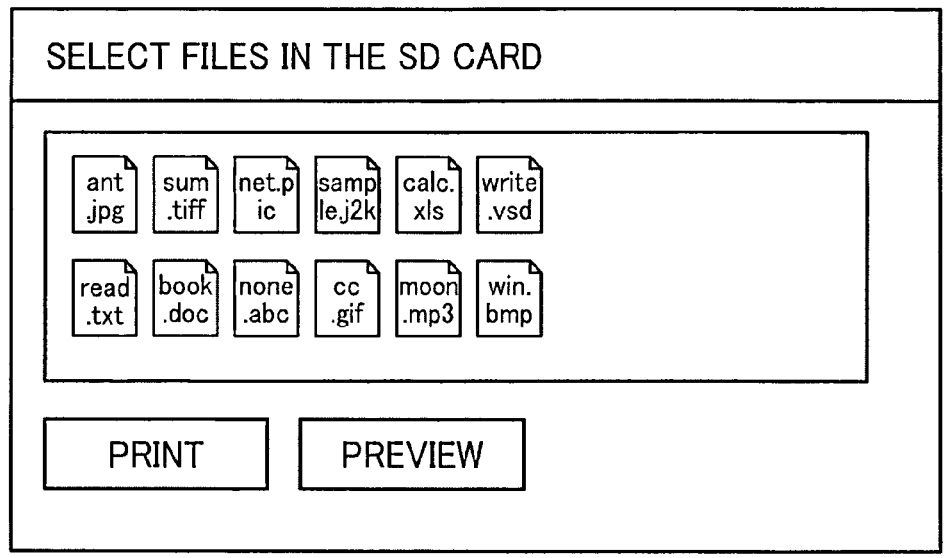
FIGS. 13-18 are schematic views illustrating examples of images displayed on an operation panel illustrated in FIG. 2.

FIG. 13 illustrates the operation panel 1 when a SD card is inserted into the data input/output device 3. In FIG. 13, the names of various files with extensions are displayed. The display image is not limited thereto. For example, a display image in which icons of files are displayed while being changed depending on the extensions thereof or a display image in which a file list is displayed only by using characters may be used.

Figure 14:
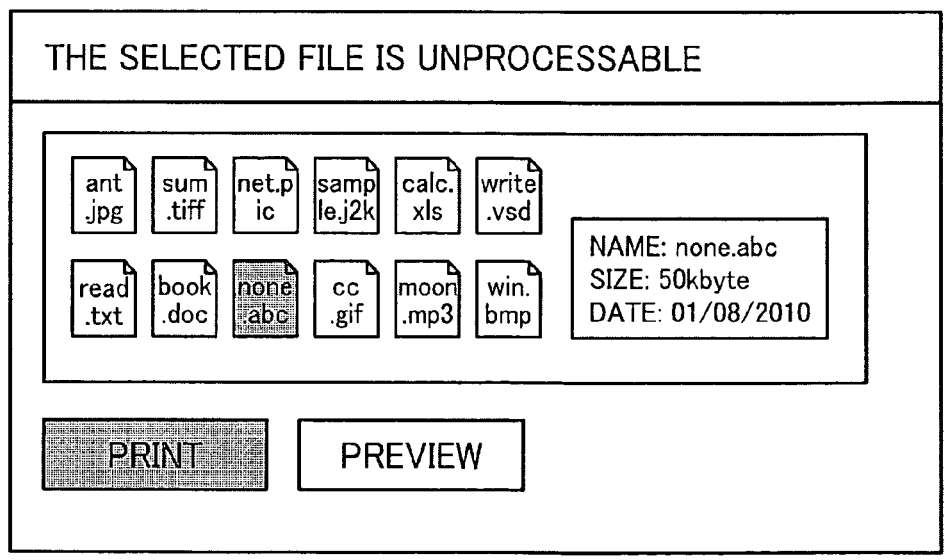

FIG. 14 illustrates the operation panel 1 when an unavailable file (i.e., a file which the main body of the MFP cannot process) is selected. The case illustrated in FIG. 14 occurs, for example, when the extension of a file selected by a user is unavailable to the main body of the MFP, and a print request is made by the user. In addition, it is preferable that as illustrated in FIG. 14, the information concerning the selected file is displayed (the icon of the selected file is shaded) in the operation panel 1.

Figure 15:
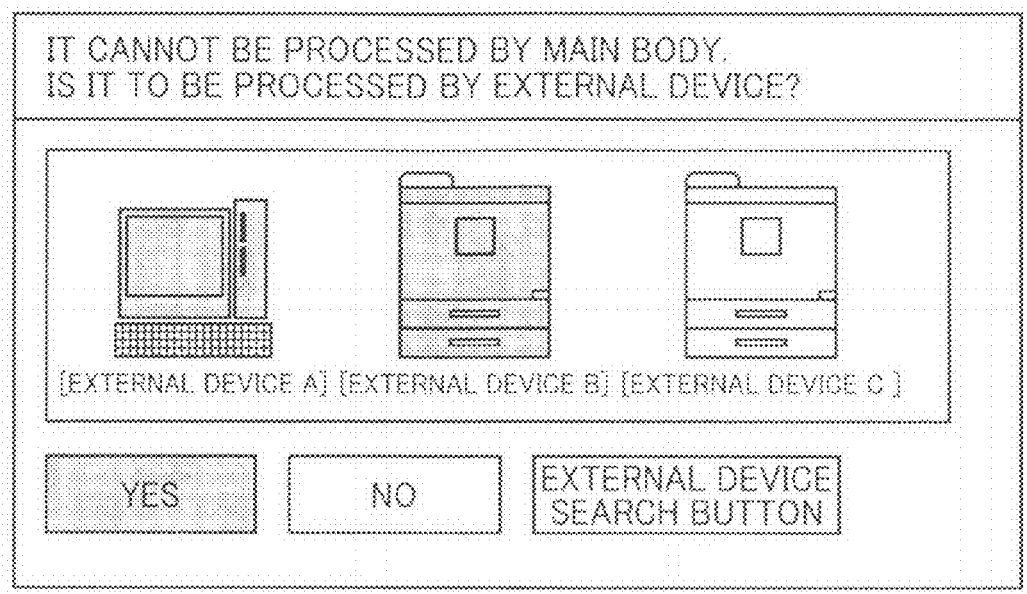

FIG. 15 illustrates the operation panel 1 when a file which the main body of the MFP cannot process is selected. As illustrated in FIG. 15, when the main body of the MFP cannot process the selected file in terms of the file format, an external device which can process the file is displayed. It is preferable that, as illustrated in FIG. 15, the external device C, which can process the selected file, is displayed so as to be white and the external devices A and B, which cannot process the selected file, are displayed so as to be grey. In this regard, when there are other external devices, the user pushes an external device search button to perform a search for other external devices. In this case, the convertible data D2 are updated, and the searched external devices including an external device capable of processing the file and an external device incapable of processing the file are newly displayed in the operation panel 1 while the external device incapable of processing the file is grayed.

Figure 16:
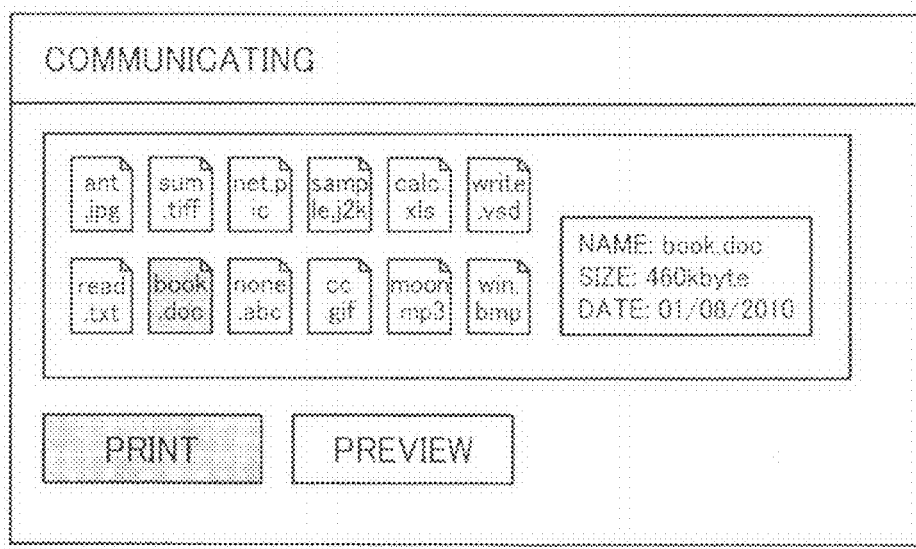

FIG. 16 illustrates the operation panel when a file (i.e., book.doc), which cannot be processed by the main body of the MFP, is selected, and the file is transferred to the external device 8 (i.e., the external device C) to be processed. In this regard, during the file is processed by the external device 8, a message "communicating" is displayed in the operation panel 1 as illustrated in FIG. 16 so that the user awaits completion of the processing.

Figure 17:
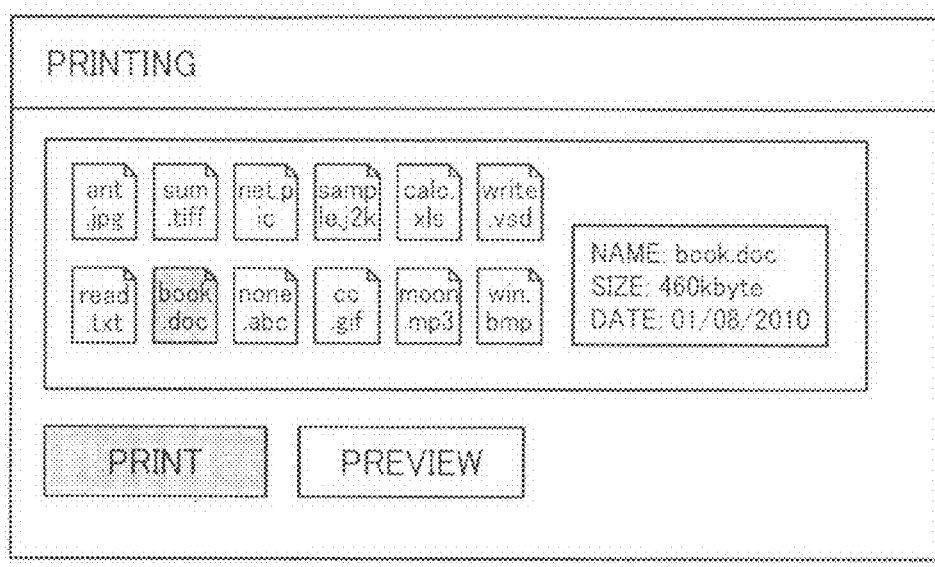

FIG. 17 illustrates the operation panel 1 when a file, which can be processed by the main body of the MFP, is processed by the main body or a file, which cannot be processed by the main body and can be processed by the external device 8, is processed by the external device. In this case, a message "printing" is displayed in the operation panel as illustrated in FIG. 17.

Figure 18:
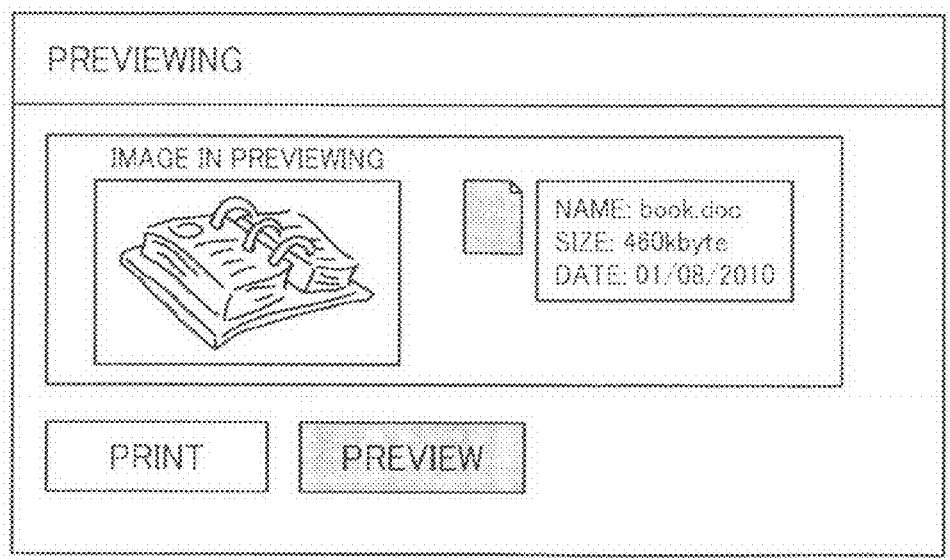

FIG. 18 illustrates the operation panel 1 when a file, which can be processed by the main body of the MFP, is selected and a request for preview is made, or when a file, which cannot be processed by the main body of the MFP, is selected and the external device 8 processes the file to preview the file. As illustrated in FIG. 18, main information (such as name, size and preparation date) on the selected file is displayed.

Next, the operation of the example of the image processor of the present invention will be described by reference to FIGS. 13-18.

Initially, reading of a file and judgment on whether or not to process the file will be described.

When the data input/output device 3 notifies the controller 2 that a SD card is inserted thereinto by a user, the controller 2 reads the data stored in the SD card, and expands the information of the file in the memory 5. The controller 2 confirms the file information thus expanded in the memory 5, and displays the contents of the data stored in the SD card on the operation panel 1 as illustrated in FIG. 13.

Referring to FIG. 13, the user selects a file among the files displayed on the operation panel 1 to request an operation of printing or previewing the file. The operation request input to the main body of the MFP via the operation panel is input to the controller 2 as a request signal. Upon receipt of the request, the controller 2 judges as to whether or not the file can be processed by the main body of the MFP based on the file information.

When the file can be processed by the main body of the MFP, the controller 2 controls the data input/output device 3 so that the designated image data are expanded in the memory 5 while being stored in the HDD 6.

If the image data remain in the memory 5 even after the expanding and storing operations are performed, the controller 2 performs the following operation. Specifically, when the user requests to print the image, the controller 2 controls the image converter 9 to convert the image data to print data, and then controls the output device 7 to print the image as illustrated in FIG. 17. When the user requests to preview the image, the controller 2 controls the image converter 9 to convert the image data to display data to display the image on the operation panel 1 as illustrated in FIG. 18.

When the file cannot be processed by the main body of the MFP because the size of the file is greater than the capacity of the memory 5 or the file format is not available to the main body of the MFP, the controller 2 communicates with the external device (or devices) 8 through the external communication device 4 to ask whether or not the external device (or devices) can communicate with the controller and process the file.

If it is impossible for the external device 8 to perform communication or processing, the controller 2 displays a message "It cannot be processed by the main body" in the operation panel 1 as illustrated in FIG. 15.

If it is possible for the external device 8 to perform communication and processing, the controller 2 displays a message "Communicating with the external device" in the operation panel 1 as illustrated in FIG. 16 while controlling the data input/output device 3 to expand the designated image data in the SD card in the memory 5 while storing the data in HDD 6. Next, the controller 2 expands a command to the external device and parameters needed for determining the image qualities in the memory 5, and transfers the data to the external device 8 together with the image data in the memory 5 through the external communication device 4.

After the external device 8 understands the command and the parameters, the external device starts application program needed for expanding the received image data. Next, the external device 8 converts the expanded image data to such print data according to the set image quality parameters, and then sends the print data to the main body of the MFP.

After the controller 2 receives the print data through the external communication device 4, the controller expands the print data in the memory 5 while storing the data in the HDD 6. When the command is to print the image, the controller 2 expands the print data in the memory 5, and then controls the output device 7 to print the image. When the command is to preview the image, the controller 2 controls the image converter 9 to convert the print data to display data to display the image on the operation panel 1 as illustrated in FIG. 18.

Next, the operation of the example of the image processor will be described by reference to flowcharts.

Figure 19:
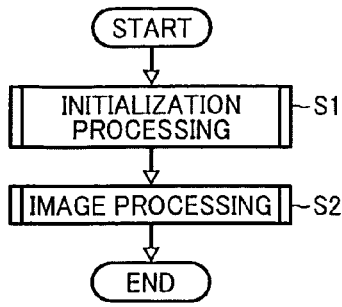
FIG. 19 is a flowchart illustrating an image processing operation of an image processor of the present invention.

FIG. 19 illustrates flow of the operation of this example. As illustrated in FIG. 19, the operation is broadly classified into an initialization processing (step S1) and an image processing (step S2). For example, the initialization processing (step S1) is automatically performed when the main body of the MFP is activated. In addition, for example, the image processing (step S2) is automatically performed when the SD card is inserted into the data input/output device 3 and the controller 2 detects the insertion of the SD card.

Figure 20:
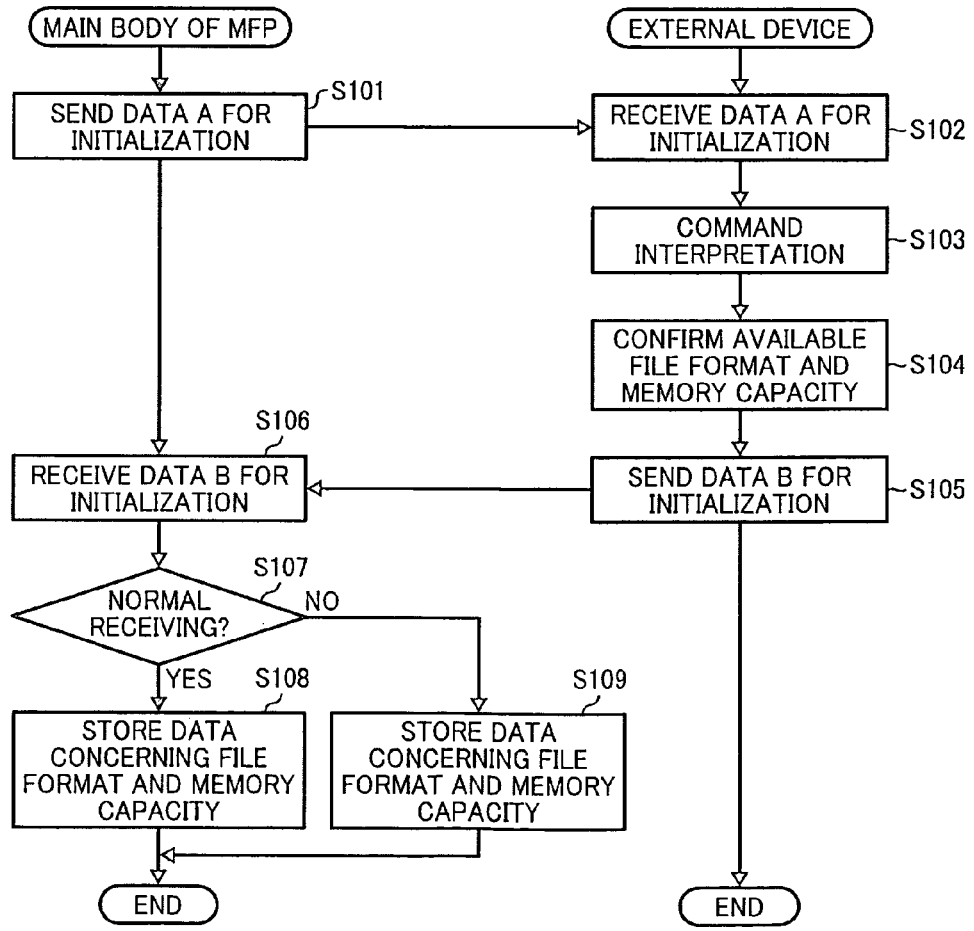
FIG. 20 is a flowchart illustrating the initialization processing illustrated in FIG. 19.

FIG. 20 illustrates flow of the initialization processing (step S1). The controller 2 sends data A for use in the initialization processing to the external device 8 (step S101). After receiving the data A for initialization (step S102), the external device 8 interprets the command included in the data A (step S103).

Figure 21:
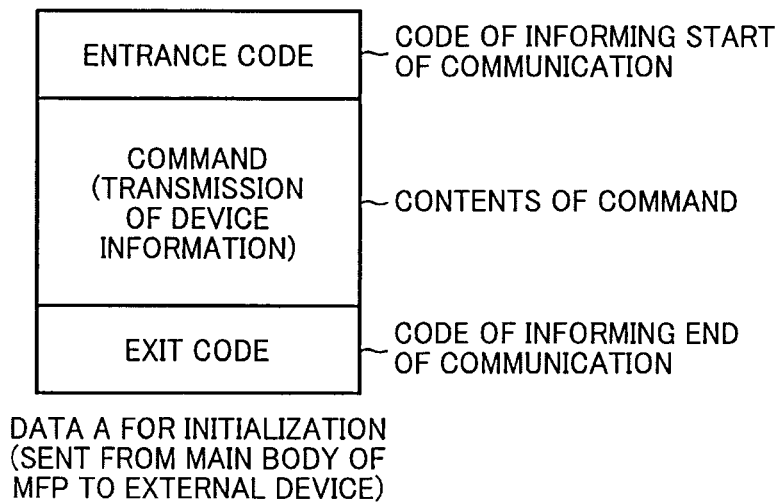
FIG. 21 is a schematic view illustrating structure of data A for the initialization processing.
Figure 22:
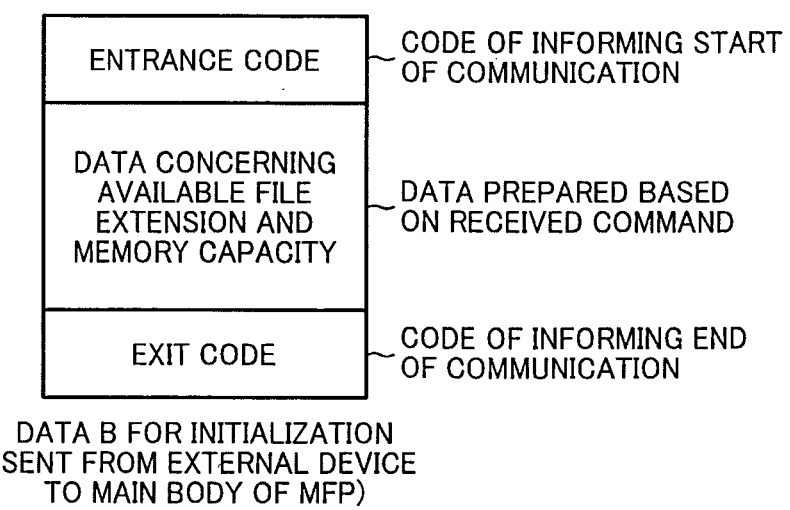
FIG. 22 is a schematic view illustrating structure of data B for the initialization processing.

FIG. 21 illustrates the structure of the data A for initialization. The data A include an entrance code representing start of communication, an exit code representing end of communication, and a command to be sent to the external device 8, which is sandwiched by the entrance code and the exit code. The command is an order to send the information on the external device. After interpreting the command, the external device 8 produces data B for initialization including data concerning available file formats with extension and available memory capacity (e.g., in units of megabytes) as illustrated in FIG. 22.

Referring back to FIG. 20, after the external device 8 confirms the available file formats and memory capacity (step S104) and produces the data B, the external device sends the data B to the main body of the MFP (step S105).

After the main body of the MFP receives the data B for initialization (step S106), the main body confirms whether or not to normally receive the data B (step S107). When the data B for initialization are normally received, the main body of the MFP interprets the data B and stores the information concerning the available file formats and memory capacity in the external device data D1 (step S108). If the data B are abnormally received, the main body determines that it is impossible to communicate with the external device, and stores such information that the external device cannot be used in the external device data D1 (step S109).

When there are plural external devices, the above-mentioned initialization processing is performed on each of the external devices.

Figure 23:
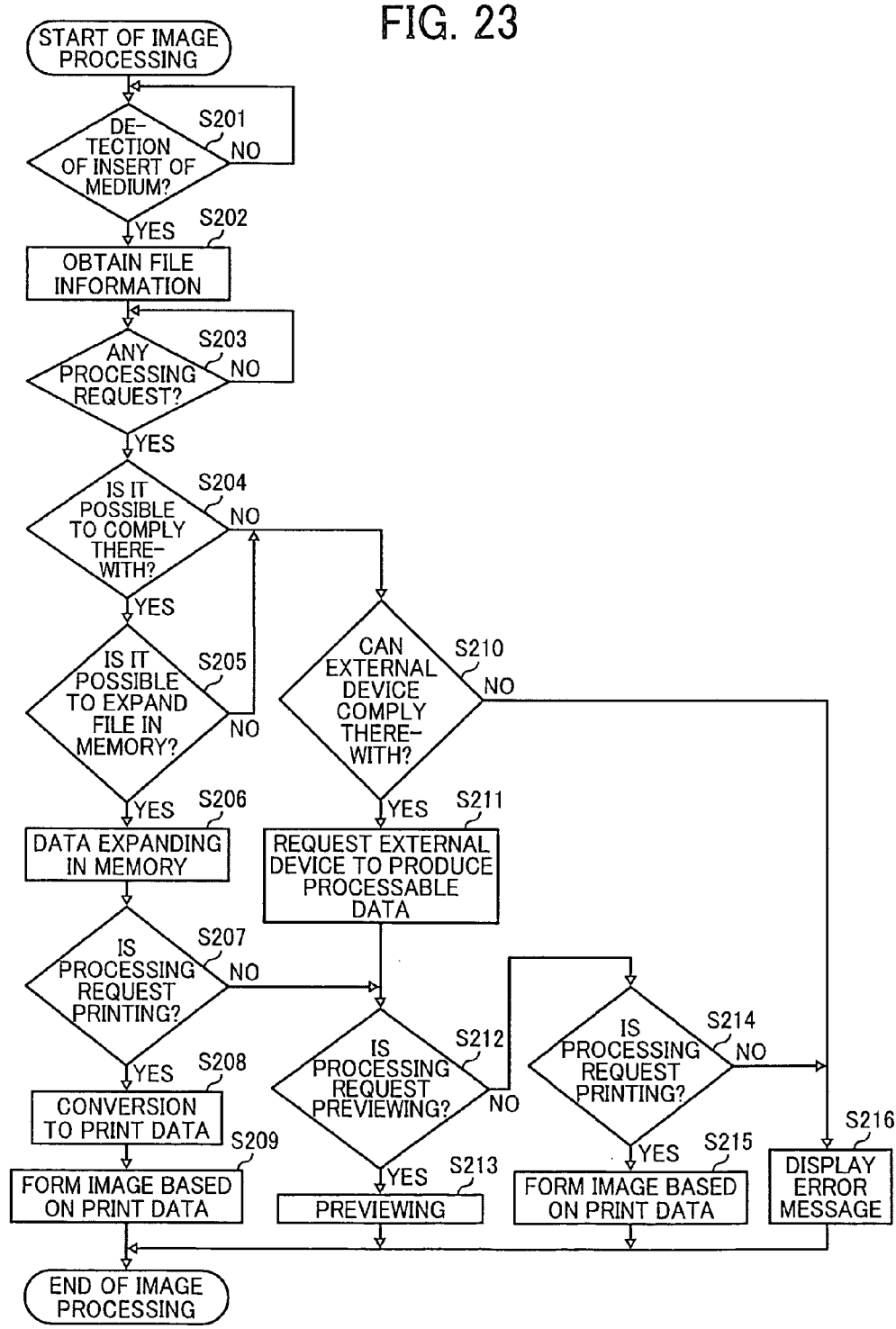
FIG. 23 is a flowchart illustrating the image processing illustrated in FIG. 19.

FIG. 23 illustrates flow of the image processing (step S2). In this regard, the device performing the processings illustrated in the steps in FIG. 23 is the controller 2 unless otherwise specified.

When the controller 2 detects that a SD card is inserted (Yes in step S201), the controller obtains file information from the SD card (step S202) while awaiting a request for processing from a user or the like (step S203). In this regard, the file information is information concerning the extension and file size of each of the files stored in the SD card.

Upon receipt of a processing request, the file format checker 31 of the judging section 30 judges whether or not the file format of the file to be processed is available to the main body of the MFP (step S204). In addition, the capacity checker 32 of the judging section 30 judges whether or not the file to be processed can be expanded in the memory in terms of the size of the file (step S205).

In a case where the results of the checks performed by the file format checker 31 and the capacity checker 32 are "Yes", after the data are expanded in the memory, the expanded data are converted to print data to be printed by the output device 7 when the request is a printing request (steps S206-S209).

In a case where any one of the check results is "No", the controller 2 judges whether or not the external device (or devices) 8 can process the file by reference to the external device data D1 and the convertible data D2 (i.e., by checking the file formats and file size available to the external device) (step S210).

When the external device 8 can process the file (Yes in step S210), the controller 2 requests the external device 8 to produce processable data which can be processed by the main body of the MFP (step S211). This processable data producing request will be described below in detail by reference to FIGS. 24-26.

When the user's request is to preview the image, the file, which is changed to processable data, which can be processed by the main body of the MFP, as a result of the step S211, is displayed as an image on the operation panel 1 (step S213). When the user's request is to print the image (Yes in step S214), the file is printed by the output device 7 (step S215). When the user's request is other than the previewing or printing request (No in step S214), an error message such as "It is impossible to satisfy the requirement" is displayed on the operation panel (step S216).

Next, the processable data producing request in step S211 in FIG. 23 will be described.

Figure 24:
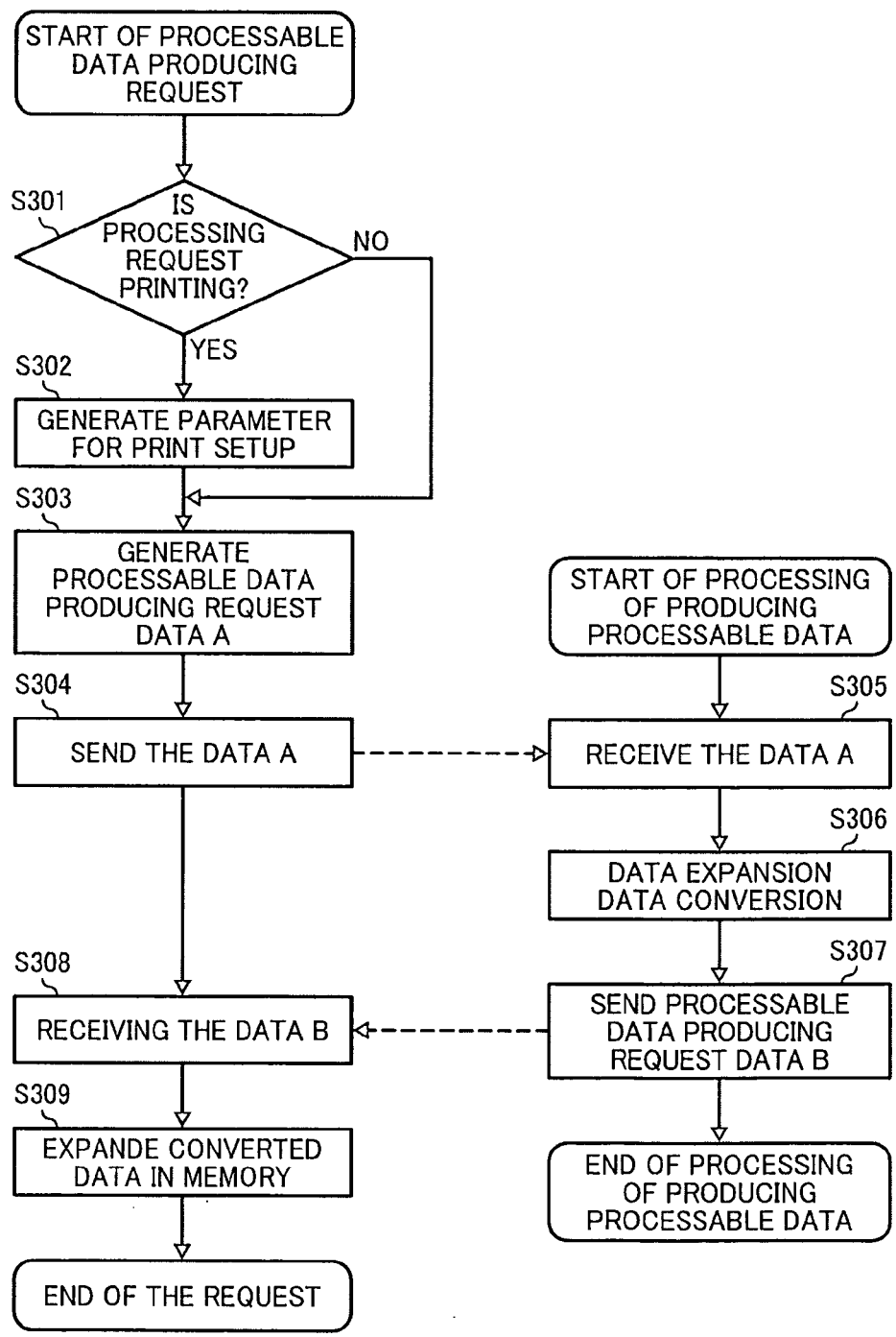
FIG. 24 is a flowchart illustrating a processable data producing request to an external device.

FIG. 24 illustrates flow of the processable data producing request.

Initially, the controller 2 judges whether or not the user's request (i.e., the request input in step S203 in FIG. 23) is to print the image. When the request is to print the image, the controller 2 produces parameters for use in print setup while producing processable data producing request data A and sending the data to the external device 8 (step S301-S304).

Figure 25:
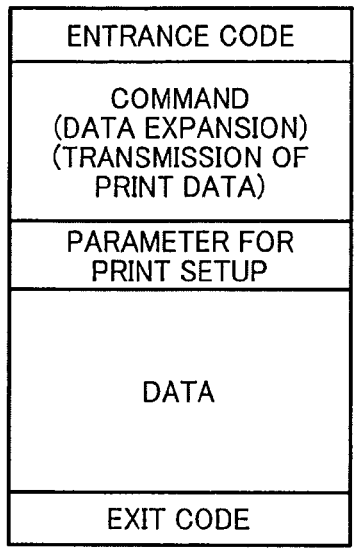
FIG. 25 is a schematic view illustrating structure of processable data producing request data A in the request for producing processable data.

FIG. 25 illustrates the structure of the processable data producing request data A. FIG. 25 illustrates a case where the user's request is to print an image.

The processable data producing request data A include an entrance code representing start of communication, an exit code representing end of the communication, and a command to be sent to the external device 8, which is sandwiched by the entrance code and the exit code. The command includes order for data expansion and print data sending, which are followed by the produced parameters for use in print setup and the data, which are the data stored in the SD card (i.e., the image data themselves).

Referring back to FIG. 24, after receiving the processable data producing request data A, the external device 8 performs data expansion and data conversion (steps S305 and S306). In this regard, the data expansion means that the data included in the processable data producing request data A are expanded in a memory (not shown) of the external device 8, and the data conversion means that the commanded processing is performed on the thus expanded data.

Since the commanded processing is print data sending in the case illustrated in FIG. 25, the data conversion processing is to produce print data. Therefore, the external device 8 produces the processable data producing request data B including the converted data and sends the data B to the main body of the MFP (step S307).

Figure 26:
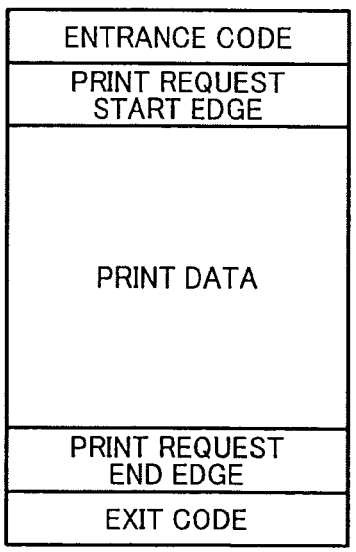
FIG. 26 is a schematic view illustrating structure of processable data producing request data B in the request for producing processable data.

FIG. 26 illustrates the structure of the processable data producing request data B. The processable data producing request data B include an entrance code representing start of communication, an exit code representing end of the communication, and a code representing start of the converted data (i.e., print request start edge), the converted data and a code representing end of the converted data (i.e., print request end edge), which are sandwiched by the entrance code and the exit code.

Referring back to FIG. 24, after receiving the processable data producing request data B, the main body of the MFP expands the converted data in the memory 5. Thus, this processing is completed. The expanded data are print data when the user's request is a printing request, and the desired image is printed out by the output device 7 (step S215 in FIG. 23). When the user's request is a previewing request, the expanded data are image data suitable for previewing, and the desired image is displayed on the operation panel 1 (step S213).

As described above, in the present example of the image processor, a file, which is input to the main body of the MFP but which cannot be processed by the main body in terms of the file format or file size, is transferred to the external device 8 together with a processable data producing request to be converted to data which can be processed by the main body.

As a result, the convenience of the main body of the MFP can be enhanced. Specifically, even when the performance and function of the MFP are not improved, the MFP can process an unprocessable file by using external devices.

The present invention is not limited to the example mentioned above. For example, the following modifications are possible.

In step S210 in FIG. 23, the controller 2 judges whether or not to make a processable data producing request by reference to the available file format and memory capacity of the external device 8. However, it is possible that the MFP previously obtains information on whether the external device has a license of handling a file with the file format in the initialization processing, and makes the judgment based on the information.

In this modified example, for example, the MFP previously sends an inquiry to the external device 8 about whether or not to process a file in terms of an extension thereof (such as ".abc") in the initialization processing. By using this method, MFPs, which have no license for a file format but which are connected with an external device having a license therefor, can process the file.

In the above-description, the meaning that a MFP can process a file is that when a file is input to a MFP, the MFP can perform a desired processing on the file to obtain the desired output. In this regard, the input file includes at least image data, and the user's request includes at least printing the image. In addition, the processing on the file includes at least a printing processing, and the desired output includes at least printing an image.

Additional modifications and variations of the present invention are possible in light of the above teachings. It is therefore to be understood that within the scope of the appended claims the invention may be practiced other than as specifically described herein.

What is claimed is:

1. An image processor comprising:
   a memory to store information on a file format and a maximum file size of image data which can be processed by the image processor and information on a file format and a maximum file size of image data which can be processed by each of one or more external devices;
   a judging device to judge whether image data input to the image processor can be processed by the image processor or the one or more external devices in terms of the file format and the file size by reference to the information stored in the memory;
   an image converter to convert the input image data so as to be output by the image processor;
   a transfer controller to transfer the input image data to one of the one or more external devices when the judging device determines that the input image data cannot be processed by the image processor but can be processed by the one of the one or more external devices while transferring the input image data to the image converter when the judging device determines that the input image data can be processed by the image processor;
   an external device information controller to reflect information on an available capacity of the one or more external devices and the file format available thereto to an external device data;
   a convertibility checker to determine, based on a convertible data, whether or not an image conversion requested by the transfer controller can be performed; and
   an output device to output an image based on the image data processed by the one of the one or more external devices or the image converter.

2. The image processor according to claim 1, wherein the output device outputs an image according to image data which are produced by the external device by converting the input image data so as to be able to be output by the image processor.

3. The image processor according to claim 1, wherein the transfer controller obtains the information on the file format and the maximum file size of image data which can be processed by each of the one or more external devices by communicating with the one or more external devices.

4. The image processor according to claim 1, wherein the image data are input to the image processor by a removable medium.

5. An image processing system for processing input image data, comprising:
   the image processor according to claim 1;
   one or more external devices; and
   a network through which the image processor is communicably connected with the one or more external devices.

* * * * *